Oct. 28, 1930.  H. L. JOYCE  1,779,773
VEHICLE TRAFFIC SIGNAL SWITCHING MEANS
Filed June 18, 1929
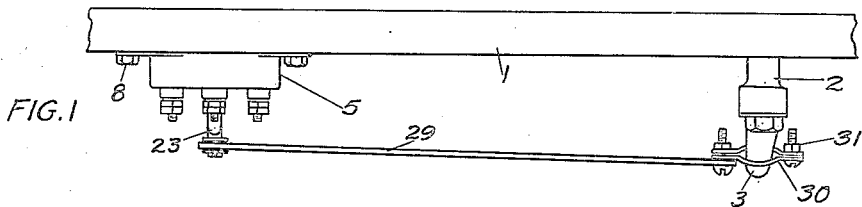
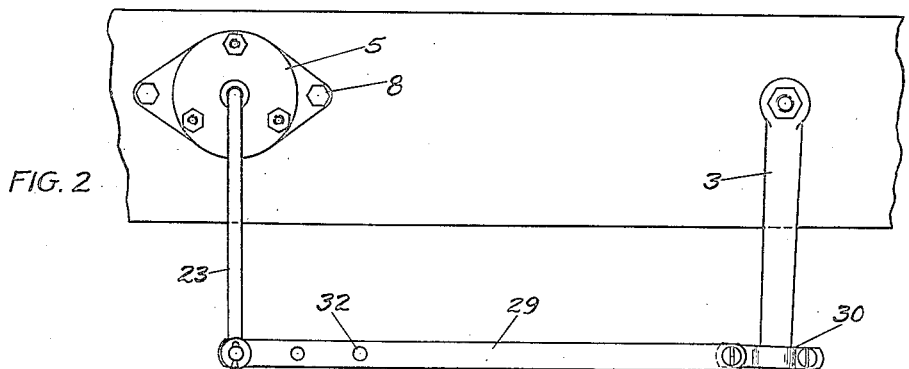
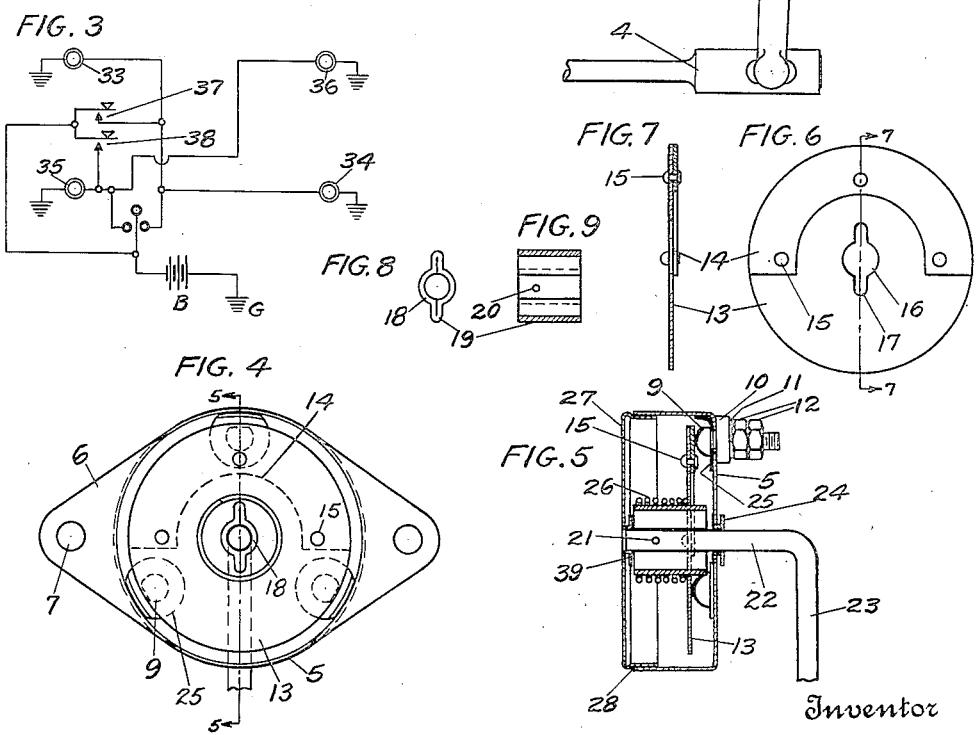
Inventor
HAROLD L. JOYCE
By His Attorney
A. D. T. Libby Patented Oct. 28, 1930

1,779,773

UNITED STATES PATENT OFFICE

HAROLD L. JOYCE, OF EAST ORANGE, NEW JERSEY, ASSIGNOR TO JESSE O. BOLTON, OF NEW YORK, N. Y.

VEHICLE TRAFFIC-SIGNAL SWITCHING MEANS

Application filed June 18, 1929. Serial No. 371,790.

In the operation of automotive vehicles, it has been proposed to equip the same with traffic signals which are operated by the driver of the vehicle to indicate the direction in which a turn is to be made, and my present invention is directed to providing a positive and substantial switching means for the control of such traffic signals, which are preferably in the form of electric lights operated by the electrical system on the automotive vehicle.

It is therefore the principal object of my invention to provide a switching means which will control the traffic signals on an automotive vehicle, and which is operated automatically by the mere act of turning the steering wheel, thereby giving indication preferably on both the front and rear part of the vehicle as to the intentions of the driver with respect to making the turn.

Another object of my invention is to provide switching means to accomplish the principal purpose, which contains a relatively small number of parts and is therefore cheap to manufacture, and one which may be readily installed on vehicles that are already in operation, as well as on new ones.

These and other objects will be understood by one skilled in the art, after a study of the specification taken in connection with the annexed drawing, wherein:

Figure 1 is a partial plan view showing the switching means mounted on the side frame member of the vehicle.

Figure 2 is a side elevation of Figure 1.

Figure 3 is a diagrammatic view showing the traffic signals which are controlled by the switching means shown in Figures 1 and 2. Also an independent emergency control is illustrated.

Figure 4 is a plan view of the switch per se with certain of the interior parts shown in dotted position.

Figure 5 is a section on the line 5—5 of Figure 4.

Figure 6 is a plan view of the switch contact member shown in dotted lines in Figure 4.

Figure 7 is a section on line 7—7 of Figure 6.

Figure 8 is an end view of one of the control members used with the switch.

Figure 9 is a longitudinal sectional view through Figure 8.

Referring now to the details wherein like numbers refer to the corresponding parts in the various views, 1 is the side panel of a chassis of an automotive vehicle. The bracket 2 supports an operating member carrying an arm 3 which is operated by the steering wheel. Connected to the arm 3 is the usual reach rod 4 that extends to the steering wheel of the vehicle.

Mounted on the side of the frame member 1, is a switch box 5, preferably of metal. The box 5 is provided with flanges 6 having holes 7 therein for the purpose of securing the box to the frame member in any satisfactory manner as by bolts 8. The switch box 5 carries a plurality of contacts 9, three being utilized in the construction to be described.

These contact members 9 are fastened to the casing 5 by suitable insulators 10 and lock washers 11 and nuts 12.

Mounted within the casing 5, is a switch member 13, preferably of strong insulating material, and to this member 13 is attached an arcuately formed contact segment 14, the same being held to the disc 13 in any satisfactory manner as by rivets 15, which are positioned so as to be out of the path of the contacts 9, as is clearly shown in Figure 5. The disc 13 is provided with a circular opening 16 and oppositely arranged notches 17. The opening 16 and notches 17 are adapted to receive a member having a circular portion 18 and fins 19 which fit in the notches 17. The member 18 is preferably made from a piece of tubing formed to the shape shown by suitable tools.

A hole 20 is provided to receive a cotter pin 21 which also projects through the bent end 22 of a control rod 23. The end 22 is positioned in a collar 24 carried by the casing 5, and extends through the opening 16 in the disc 13 and through the hole in the body of the member 18, thereby holding the member 18 securely to the end 22 of the control rod, as well as in position in the disc 13, thus giving a positive and strong connection between the control rod 23 and the switching disc 13 which can rotate to any desired angle. The contacts 9 are of course insulated from the casing 5 by suitable insulators 25, and the contact segment 14 is held in position to suitably engage the contacts 9 by means of a spring 26 which presses against the disc 13 when the cover 27 is pushed into position on the casing 5.

The cover has a bushing 39 for receiving the end 22 of the control rod. The bushing also engages the end of member 18 when the cover is in place, thereby holding the member 18 in position. The cover is so formed at 28 that when it is pressed into position, it is securely held by the casing 5 and furthermore, as will be seen in Figure 1, the cover portion of the casing is placed directly against the frame member 1, so that it cannot get out of position, but when the switch is removed from the frame member 1, a suitable tool can be used to force the cover 27 from its casing 5.

The control lever 23 is attached to the arm 3 by means of a rod 29 and an adjustable clamp 30 held to the member 3 by suitable screws and bolts 31. The member 29 may be provided with a plurality of holes 32 in order to accommodate the mounting of the switch 5 on the frame member 1.

As will be seen by reference to Figure 3, the traffic lights 33 to 36 inclusive, are preferably connected to the switch contacts in alternate relationship; that is to say, the front light 33 and the rear light 34 on the opposite sides of the vehicle, are connected to one of the contacts 9, while the front signal 35 and the opposite rear signal 36 are connected to another of the contacts 9. The centrally or intermediately located contact of the switch, is connected to the live side of the vehicle battery, and as a turn is made in one direction, the contact segment 14 which is normally out of engagement with the contacts 9 leading to the signals, will be moved to connect one of these contacts to the battery contact, depending on which way the steering wheel is turned.

Should for any reason a wire become broken in the switching system, push buttons 37 and 38 may be mounted on the steering column adjacent the steering wheel, so that these may be operated by hand to light the signals 33 and 34, or 35 and 36, depending on the turn that is to be made.

It will be clear that certain of the details comprising my switching means may be varied somewhat, without departing from the spirit of my invention or the scope of the appended claims.

Having thus described my invention, what I claim is:

1. A switching means for the purpose described, including a casing adapted to be mounted on a relatively stationary part of a vehicle, a plurality of contacts carried by but insulated from the casing, one of said contacts being connected to a source of current, while the other contacts are connected to different signal circuits, a rotary switch member within the casing and carrying a contact piece to connect the source of current from said contact to other of said contacts, and an operating member passing through the wall of the casing and through said switch member, a member slidable over said operating member and fastened thereto and having means for engaging said switch member to complete a driving connection therewith, a spring within the casing for holding the switch member in operative position, and a control rod forming a connection between said operating member and a part of the vehicle actuated by the steering wheel.

2. A switching means for signals on an automotive vehicle including a casing adapted to be fastened to a relatively stationary part of the vehicle, a plurality of contacts carried by the casing but insulated therefrom, one of said contacts being connected to a source of current on the vehicle and the other contacts being connected to different signal circuits on the vehicle, a disc of insulating material rotatably positioned within the casing, a metallic segment carried by the disc and being normally and continuously in connection with only the contact connected to the source of current, said disc having a hole and notches therein, a member fitting in said hole and having fins to fit said notches, an operating rod end extending through the casing and said member, means for fastening the rod and member together, a cover for the casing, a spring held by the cover against said disc, and means for connecting said operating rod to a part actuated by the steering wheel of the vehicle.

3. A switching means for signals on an automotive vehicle including a casing adapted to be fastened to a relatively stationary part of the vehicle, three spaced contacts carried by the casing but insulated therefrom, one of said contacts being connected to a source of current on the vehicle, the other contacts being connected to different sets of signals on the vehicle, an insulating disc within the casing and having a centrally arranged hole and at least one positioning and driving notch, a hollow member formed to fit said hole and notch, an operating rod end extending into the casing and through said hollow member, means for anchoring the rod end and member together, said disc carrying a contact segment capable of bridging at different positions of the disc, the contact connected to the source of current and either of the other contacts, a spring to press the disc toward said contacts, and means for connecting said operating rod to a part actuated by the steering wheel of the vehicle.

4. A switching means for signals on an automotive vehicle including a casing adapted to be fastened to a relatively stationary part of the vehicle, a plurality of contacts carried by the casing but insulated therefrom, one of said contacts being connected to a source of current on the vehicle and the other contacts being connected to different signal circuits on the vehicle, a disc of insulating material rotatably positioned within the casing, a metallic segment carried by the disc and being normally and continuously in connection with only the contact connected to the source of current, but adapted to connect this contact to the other contacts at different times, said disc having a centrally arranged hole and at least one positioning and driving notch extending from the hole, a hollow member formed to fit said hole and notch, an operating rod extending into the casing and through said member, means for fastening the rod and member together, a cover for the casing having a bushing for the end of the rod, said bushing also acting to press against said member to hold it in position, a spiral spring positioned around said member and held by the cover in engagement with said disc, and means for connecting said operating rod to a part actuated by the steering wheel of the vehicle.

5. A switching means for signals on an automotive vehicle including a casing adapted to be fastened to a relatively stationary part of the vehicle, contacts carried by the casing for connecting a source of current to signals on the vehicle, a rotary member within the casing, a cover for the casing, a spring acting between the cover and rotary member to hold the same against said contacts, a contact segment carried by said rotary member for completing at different times, different signal circuits connected to said contacts, an operating rod having its end bent and the bent end extending within the casing and having a driving connection with said rotary member, and quick adjustable means for making attachment of said operating rod to a part actuated by the steering wheel of the vehicle.

In testimony whereof, I affix my signature.

HAROLD L. JOYCE.